United States Patent [19]

Morishita et al.

[11] Patent Number: 4,644,582

[45] Date of Patent: Feb. 17, 1987

[54] IMAGE REGISTRATION METHOD

[75] Inventors: Koichi Morishita, Kawasaki; Shinji Omori, Kodaira; Shimbu Yamagata, Kawasaki; Tetsuo Yokoyama, Nakano; Koichi Sano, Yokohama; Akira Ogushi, Matsudo, all of Japan

[73] Assignee: Hitachi, Ltd., Tokyo, Japan

[21] Appl. No.: 573,323

[22] Filed: Jan. 24, 1984

[30] Foreign Application Priority Data

Jan. 28, 1983 [JP] Japan ................................. 58-12167

[51] Int. Cl.$^4$ ............................................. G06K 9/00
[52] U.S. Cl. ......................................... 382/6; 382/44; 382/48; 382/51; 378/20; 364/731; 358/111; 356/2
[58] Field of Search ...................... 358/111; 382/6, 44, 382/45, 46, 47, 48, 18, 51; 378/20; 364/731; 356/2

[56] References Cited

U.S. PATENT DOCUMENTS

| | | | |
|---|---|---|---|
| 3,905,045 | 9/1975 | Nickel | 356/2 |
| 4,014,000 | 3/1977 | Uno et al. | 382/48 |
| 4,335,427 | 6/1982 | Hunt et al. | 382/6 |
| 4,435,835 | 3/1984 | Sakow et al. | 382/48 |
| 4,437,161 | 3/1984 | Anderson | 382/6 |
| 4,504,908 | 3/1985 | Riederer et al. | 358/111 |

*Primary Examiner*—Leo H. Boudreau
*Assistant Examiner*—Jose L. Couso
*Attorney, Agent, or Firm*—Antonelli, Terry & Wands

[57] ABSTRACT

Two images to be registered are divided into a plurality of image portions. A standard point for the registration is extracted for each of the image portions divided. Coordinate transformations between two images for the registration are conducted for each image portion by using the standard point extracted. The coordinate values transformed between the image portions are smoothed in the case that they discretely change so that they may be smoothly connected.

4 Claims, 25 Drawing Figures

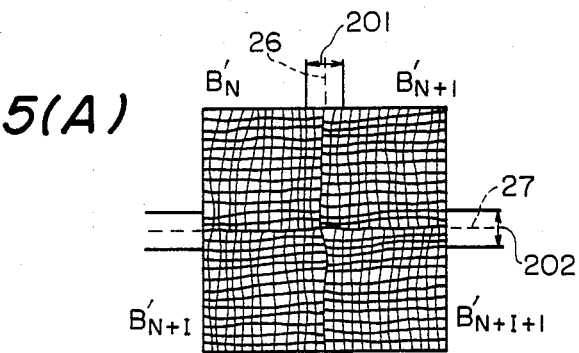
FIG. 5(A)
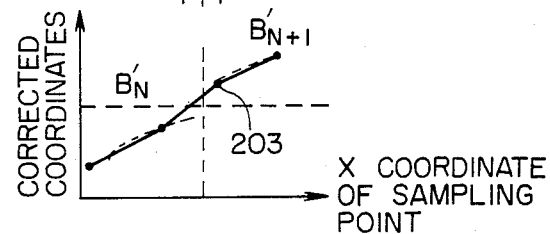
FIG. 5(B)
FIG. 7
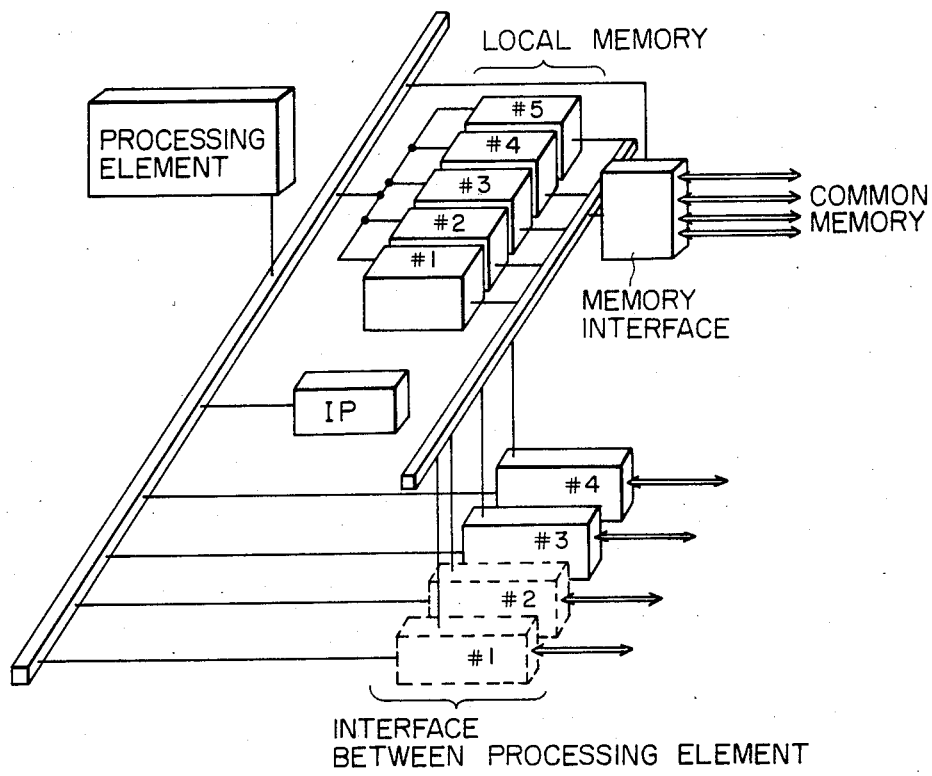

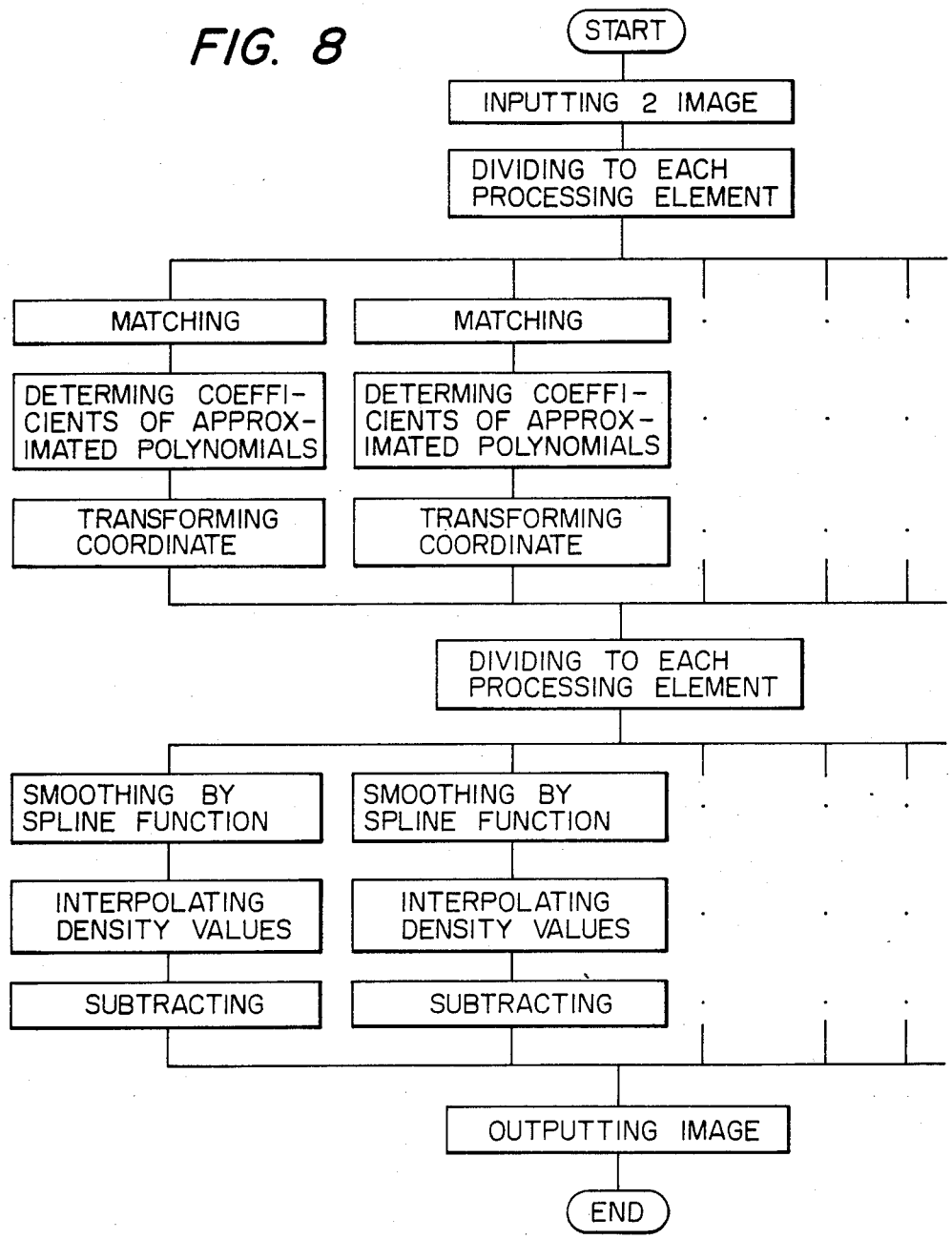

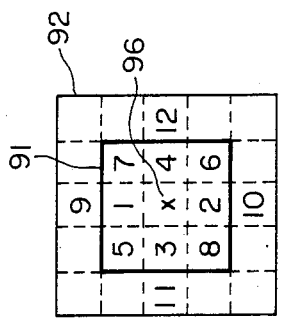
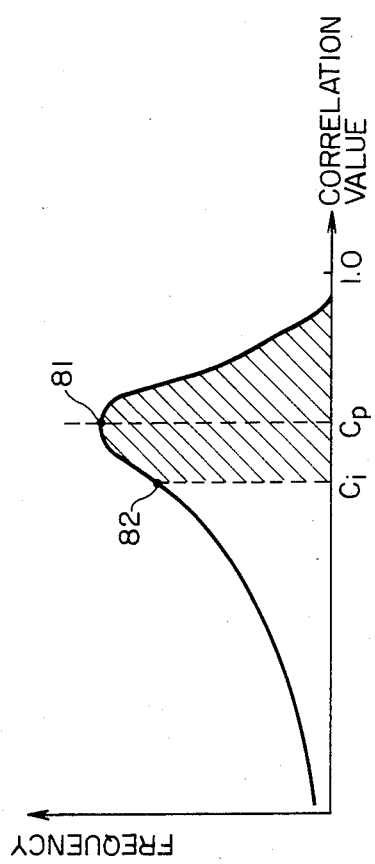
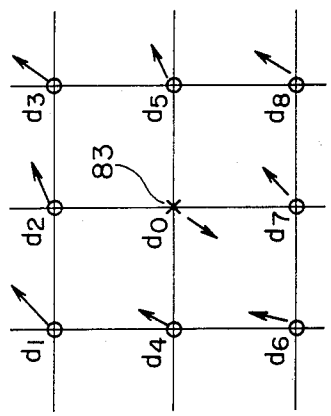

IMAGE REGISTRATION METHOD

BACKGROUND OF THE INVENTION

1. Field of the Invention

The present invention relates to an image registration system and, more particularly, to an image registration method using a digital subtraction method of extracting vascular tracts by conducting subtractions between X ray images before and after injection of a contrast media, which can register the images with high accuracy and quickly process the registration.

2. Description of the Prior Art

A vascular tract contracting method by a digital subtraction technique is one of medical methods for diagnosing an abnormality in the vascular tracts of a human body. This method is intended to clearly extract the vascular tracts, into which a contrast media has been injected, by conducting subtractions between an X ray image (which will be shortly referred to as a "mask image") taken before a contrast media takes effect (which is referred to as "before injection of the contrast media" in the present invention) before or after the contrast media is injected into the human body, and an X ray image (which will be shortly referred to as a "live image"), which is taken after a predetermined time has elapsed after the contrast media injection (which will be shortly referred to as "after the contrast media injection").

Here, there arises a problem that positional discrepancies are caused between the aforementioned two images by bodily motions or heartbeats of a body. In order to correct those positional discrepancies, the prior art used a correcting method by polynomial approximation. In this correcting method, coordinate transformations are conducted between the aforementioned two images.

In order to register images X and Y assuming that the image X is expressed by coordinates (u, v) and that the image Y is expressed by coordinates (x, y), the former image X in the coordinates (u, v) has to be transformed into and expressed by the points on a lattice of the coordinates (x, y). For the coordinate transforming equations, therefore, there can be used polynomials of higher order that can be expressed as follows:

$$u = \sum_{i=1}^{m} \sum_{j=1}^{m} a_{ij} \cdot x^{i-1} \cdot y^{j-1} = f(x, y); \text{ and}$$

$$v = \sum_{i=1}^{m} \sum_{j=1}^{m} b_{ij} \cdot x^{i-1} \cdot y^{j-1} = g(x, y),$$

where: m designates an arbitrary integer smaller than the number of standard points which will be described hereinafter; and $a_{ij}$ and $b_{ij}$ designate coefficients.

The coefficients of the aforementioned coordinate transforming equations are determined by the method of least squares. By giving the combinations of the coordinates of the standard points (e.g., the branches of vascular tracts or the ends of bones), which are common between the aforementioned two images:

$$(u_i, v_i); (x_i, y_i) \ (i=1 \text{ to } n),$$

the coefficients minimizing the value Q expressed by the following equation:

$$Q = \sum_{i=1}^{n} [\{u_i - f(x_i, y_i)\}^2 + \{v_i - g(x_i, y_i)\}^2]$$

are computed by solving the following normal equations:

$$\frac{dQ}{da_{11}} = \frac{dQ}{da_{12}} = 0; \text{ and}$$

$$\frac{dQ}{db_{11}} = \frac{dQ}{db_{12}} = 0.$$

From this, it can be determined to what position of the coordinates (u, v) the point of the coordinates (x, y) shown in FIG. 1 corresponds.

The setting of the aforementioned standard points has been conducted by the method of manually designating the characteristic points on an image or the method of using a statistical technique such as correlation or the sequential similarity detection algorithm with reference to the points, which are arranged in the form of a lattice.

In the image registration methods thus far described, however, there arises a problem that image distortion become large because the image as a whole is uniformly transformed. Moreover, the processing of the image registration is realized by the use of software, but speedup has been desired because the processing takes a long time. For setting the standard points, furthermore, a method has been desired which can detect the characteristic points more conveniently and reliably.

SUMMARY OF THE INVENTION

The present invention has been conceived in view of the background thus far described and has the object of providing an image registration method which is free of the aforementioned problems concomitant with the image registration method of the prior art and which succeeds in conducting the image registration with high accuracy and quickly processing the registration.

The first feature of the present invention for achieving the above-specified object resides in an image registration method in which two images to be registered are divided into a plurality of image portions (which will be herein called "blocks"), in which registration in conducted at the unit of said divided blocks, and in which the coordinate values transformed are, if necessary, smoothly connected between the aforementioned blocks. A second feature of the present invention resides in that the setting of standard points for detecting the positional discrepancies is conducted by simple subtractions between the two images or by comparisons of histograms. A third feature of the present invention resides in that, in the matching process for detecting the positional discrepancies, the size of a template is changed, when images underlying the template are to be compared, in accordance with the coarseness of the patterns of the images. A fourth feature of the present invention resides in that the positional discrepancy vectors obtained are compared with their peripheral vectors, in that the vectors of singular motions or having matching similarities failing to satisfy predetermined standard values are detected and removed, and in that the values of the standard points removed are assumed again from those of the peripheral vectors. By this processing, the positional discrepancy vectors are smoothed as a whole so that the entire image corrected also acquires smoothness. A fifth feature of the present invention resides in that the procedures from the matching step to the coordinate transforming step are repeatedly processed to sequentially improve the registration accuracy so that dialogic processing can be made.

BRIEF DESCRIPTION OF THE DRAWINGS

FIGS. 5(A) and 5(B) are diagrams explaining the connection between the blocks;

FIG. 7 is a schematic view of the construction of a processing element;

FIG. 8 is a processing flow chart;

FIGS. 17(A), 17(B) are diagrams explaining the method of removing positional discrepancy vectors;

FIG. 18 is a diagram explaining an example of a method of assuming the true positional discrepancy vectors at the standard point.

DESCRIPTION OF THE PREFERRED EMBODIMENTS

Figure 1:
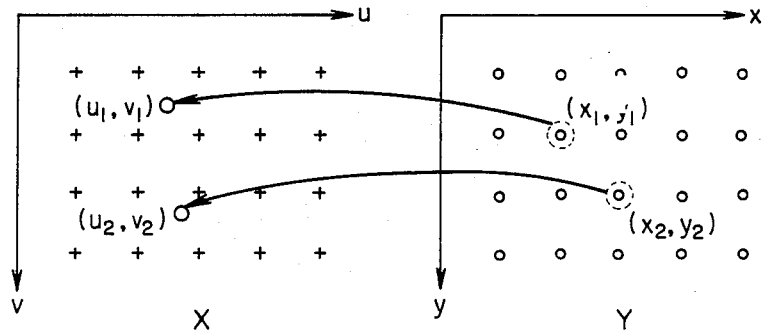
FIG. 1 is a diagram explaining the coordinate transformations.
Figure 2A:
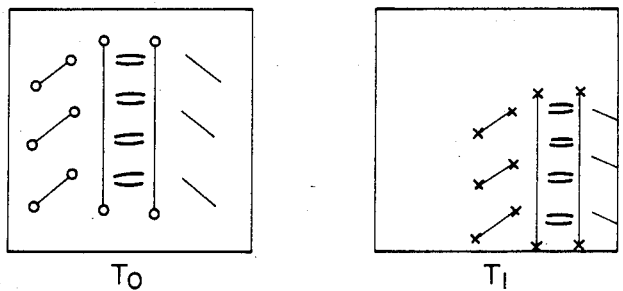
FIGS. 2(A) and 2(B) are diagrams explaining the standard point setting method of the prior art.
Figure 2B:
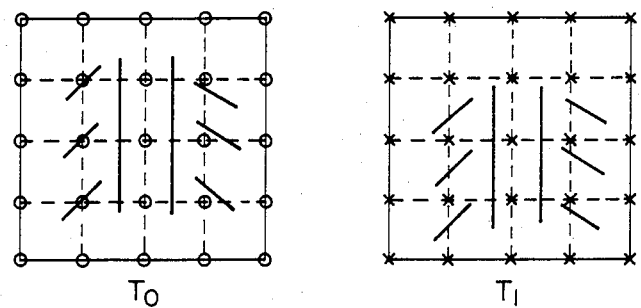

FIG. 1 shows the situation in which an image X is expressed by coordinates (u, v) whereas an image Y is expressed by coordinates (x, y). FIGS. 2(A) and (B) show an example of the method of setting standard points in accordance with the prior art. Specifically, FIG. 2(A) shows a method of manually indicating characteristic points on an image, and FIG. 2(B) shows a method of setting standard points by using a statistical method such as correlation or the sequantial similarity detection algorithm with reference to the points arranged in the form of a lattice.

The procedures of registering the images X and Y of FIG. 1 by the present invention will be described as follows in connection with specific embodiments thereof.

Figure 3:
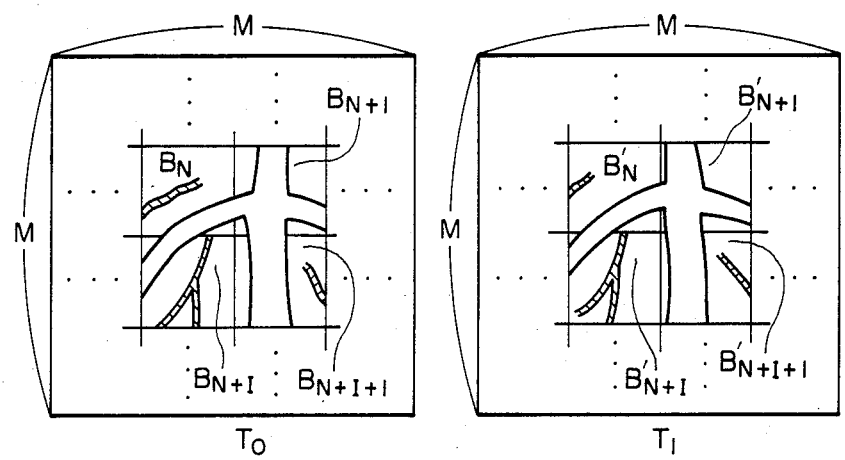
FIG. 3 is a diagram explaining the divisions of an image into blocks.

FIG. 3 schematically shows the method of dividing an image into blocks and registering the images in accordance with one embodiment of the present invention. In the present embodiment, it is assumed that images $T_0$ and $T_1$ composed of M×M picture elements (where the image $T_0$ is assumed to be the mask image and the image $T_1$ is assumed to be the live image) be divided into blocks $B_N$, $B_{N+1}$, ---; $B'_N$, $B_{N+1}$, ---, and be registered.

First of all, the standard points are extracted between the corresponding respective blocks of the images $T_0$ and $T_1$. Here, incidentally, in order to make the description of the divisions into blocks understandable, the standard point extractions resort to the well known sequential similarity detection algorithm.

Figure 4A:
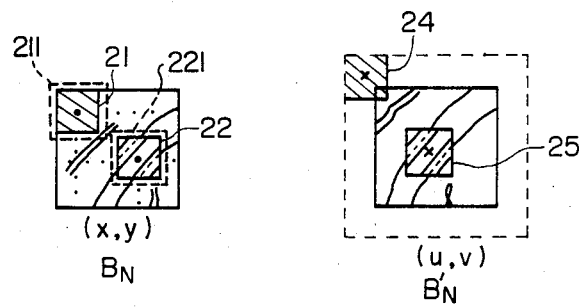
FIGS. 4(A) and 4(B) are diagrams showing the blocks in an enlarged scale.

FIG. 4(A) shows the blocks $B_N$, and $B'_N$, which are shown in FIG. 3, in an enlarged scale. It is assumed that the template images have a size indicated at 21, 22 and that search regions 211 and 221 of templates 21 and 22 has a size indicated by broken lines. Under these conditions, superpositions are conducted to extract the standard points. In the example shown in FIG. 4(A), it is indicated that the image corresponding to the template 21 and the image corresponding to a template 22 are respectively superimposed upon a portion 24 and a portion 25. Similar processings are conducted for all the blocks to determine the corresponding standard points.

From the coordinates of the standard points determined as above, the coordinate transformations are conducted by the aforementioned polynomial approximations of least squares or the coordinates of all pixel points in each block are determined by interpolation. FIG. 5(A) shows the coordinates which have been transformed for the four blocks of the image $T_1$. These coordinate transformations are conducted in parallel by assigning one processor to each block, as will be described hereinafter. By division into blocks, the accuracy of the image registrations in the blocks is improved to an outstanding level. Here, where applying least squares polynomial expressions since the blocks have different coordinate transforming coefficients, discontinuities may occur in connecting planes 26 and 27 between the blocks. At this time, in order to obviate the discontinuities, a spline function, for example, is applied to ranges 201 and 202 of picture elements n extending at both the sides of the aforementioned connecting planes thereby to effect smooth connections by the coordinate values. These connections smoothly approximate the n number of the coordinate values in the block $B'_N$ and the n number of the coordinate values in the block $B'_{N+1}$ as shown in FIG. 5(B). In FIG. 5(B), incidentally, the corrections shown are in the direction X. However, these corrections are naturally similar even in the direction Y.

Figure 4B:
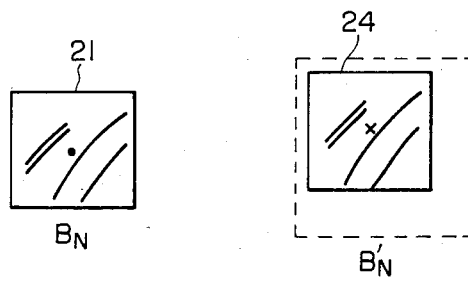

FIG. 4(B) shows an example in which the size of one block is equal to that of one template. In this example, the polynomial approximations of least squares cannot be applied, and the vectors of all the picture elements in an image are computed from interpolations from the positional discrepancy vectors determined for each block, and the image $T_1$ is subjected to the coordinate transformations.

Thus, a clear image can be obtained by conducting the subtractions between the image $T_1$ (i.e., the live image) and the image $T_0$ (i.e., the mask image), which have had their coordinates transformed as above, to extract the vascular tracts.

Figure 6:
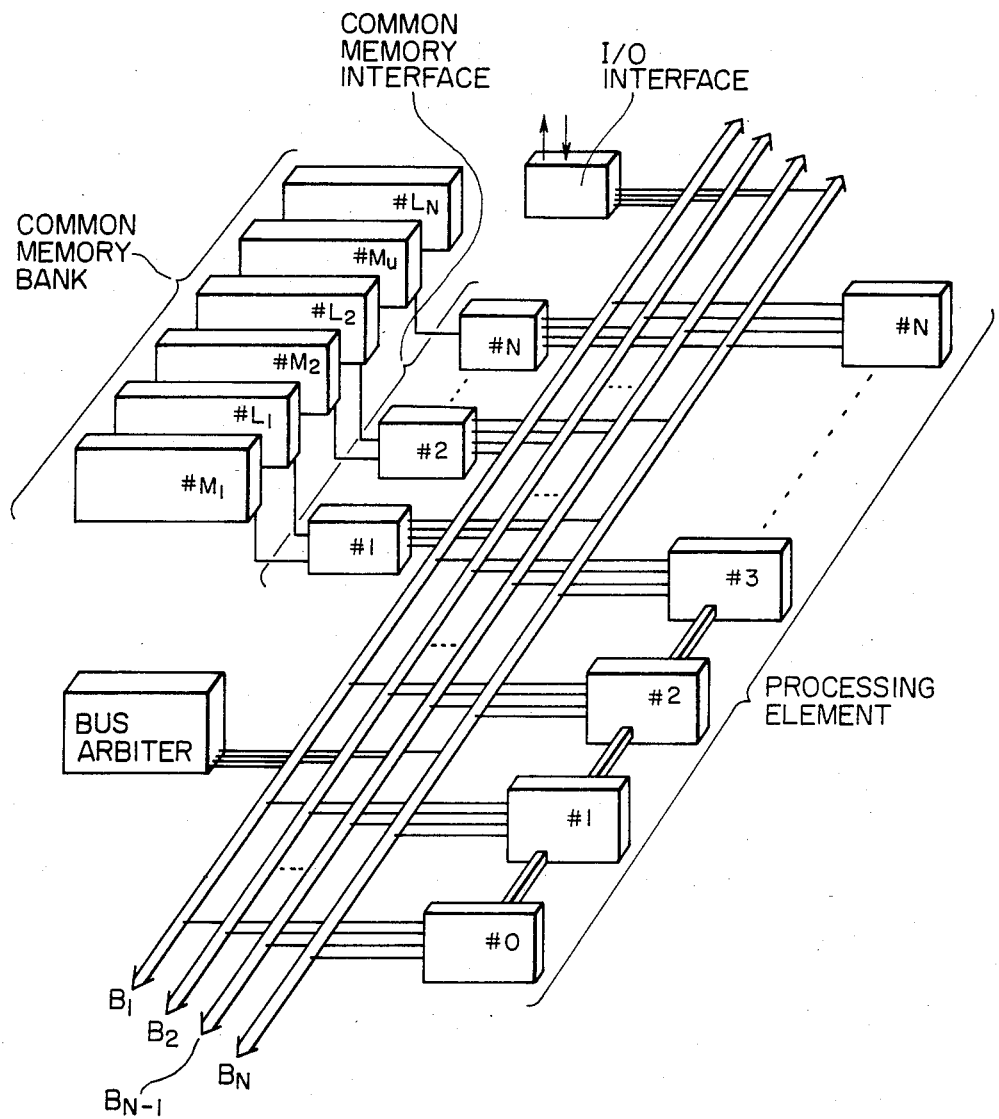
FIG. 6 is a schematic view of the construction of a processing system.

FIG. 6 shows an embodiment of a computer system for executing the aforementioned image registration algorithm at high speed. The present system is composed of: a row of N common memories of common memory banks #$M_1$ to $M_N$ for the mask image and common memory banks #$L_1$ to $L_N$ for the live image; common memories I/F acting as interfaces between respective common memories for the mask image, and for the live image; and N number of memory buses $B_1$ to $B_N$; and an (N+1) number of processing elements PE. Incidentally, each processing element PE is constructed as in FIG. 7.

The operations of the present embodiment having the construction thus far described will be described in the following. The image registration according to the present embodiment is conducted by dividing the mask image and the live image respectively into an N number of blocks and by assigning the block images respectively to the common memory banks $L_1$ to $L_N$ and $M_1$ to $M_N$. The corresponding block images are processed in parallel respectively by the processing elements PE#1 to #N. The processing element PE#0 is an administering one. Here, the image registration of the common memory banks #$L_1$ and #$M_1$ will be explained (as shown in FIG. 7).

A common memory I/F#1 stores the blocked mask image data from the common memory bank #$M_1$ and the blocked live image data from the common memory bank #$L_1$ in a local memory #1. The data thus stored in the local memory #1 is inputted to an image processor IP in the processing element PE so that the standard points are extracted by the aforementioned sequential similarity detection algorithm (which will be abbreviated into "SSDA"). On the basis of the standard point data thus computed, the coordinate transforming coefficients are determined in the image processor IP by the method of least squares so that the coordinate transformations are conducted by the use of said coefficients or the coordinates of all pixel points in each block are determined by interpolation, and the results outputted to a local memory #2.

Next, the aforementioned two corresponding blocks are connected. Before the connection is made, each processing element returns the coordinate after the aforementioned transformations to the common memory bank #$M_1$ and then transfers the coordinate values of the ranges to be connected therewith from the common memory bank #$M_1$ to the local memory #3. Here, for each element, the coordinate values are connected by using a spline function etc. so that they may change smoothly between the blocks, and the connected values are outputted to the local memory #2. On the basis of said coordinate values transformed, however, linear interpolations are conducted by the image processor IP so that the corrected image is obtained at a local memory #3. Finally, the subtraction image between the local memories #1 and #3 is obtained at the local memory #2 for each processing element. The final image data having been processed by each processor element is stored through the common memory I/F#1 in the common memory bank #$L_1$. The flow chart of the processes described in the above are shown in FIG. 8.

As is apparent from FIG. 8, incidentally, in the method of the present embodiment, the matching (i.e., the extraction of the standard points), the computation of the polynomial coefficients, and the coordinate transformations can be conducted in parallel for each block. This results in the processing time being remarkably shortened, in principle to the reciprocal of the number of divided blocks.

Here, the standard point extracting method of the present invention will be described in detail in the following although it has been left unexplained heretofore.

Figure 9:
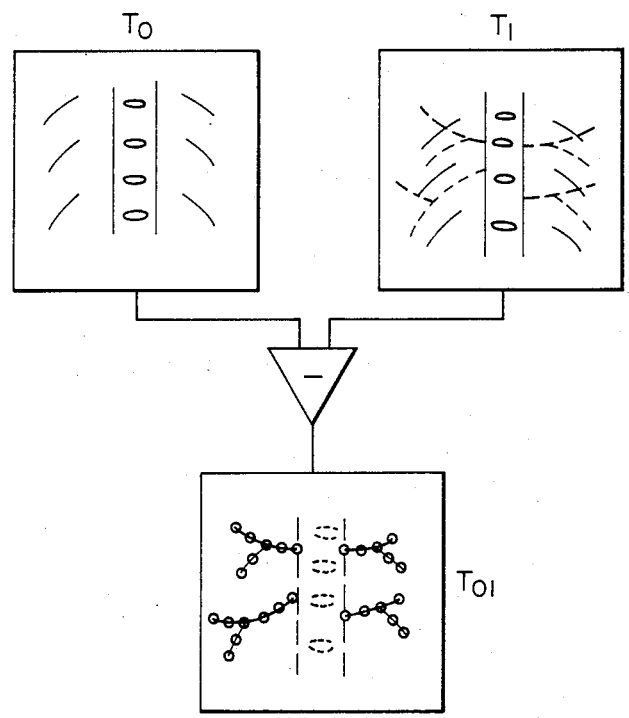
FIGS. 9 and 10 are diagrams schematically showing the process of extracting a standard point.

FIG. 9 schematically shows the step of digitally and simply subtracting the image data of the mask image $T_0$ and the live image $T_1$, which step is the preprocessing of the first embodiment of the standard point extracting method according to the present invention.

Figure 10:
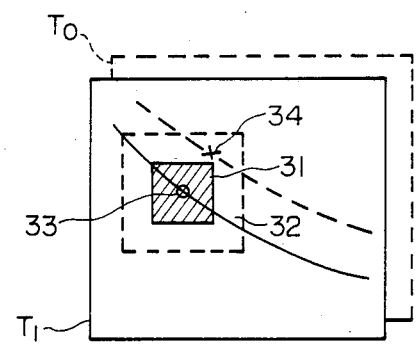

Unless there is any positional discrepancy between the mask image $T_0$ and the live image $T_1$, the portion into which the contrast media has been injected has a large absolute value in the subtraction image. Here, each picture element on an image $T_{01}$ is processed by the threshold value, and the left point is used as the standard point of the image $T_1$. Next, template matching is conducted so as to determine such a point on the image $T_0$ as corresponds to the aforementioned standard point. At this time, in order to eliminate the influences of the positional discrepancies of the images $T_0$ and $T_1$, the searched region is made larger than the window region, as has been described heretofore. As a result, even with a positional discrepancy between the images $T_0$ and $T_1$, as shown in FIG. 10, it is possible to find out such a point 34 on the image $T_0$ in a searched region 32 as corresponds to a standard point 33 on the image $T_1$ in a window region 31.

Figure 11:
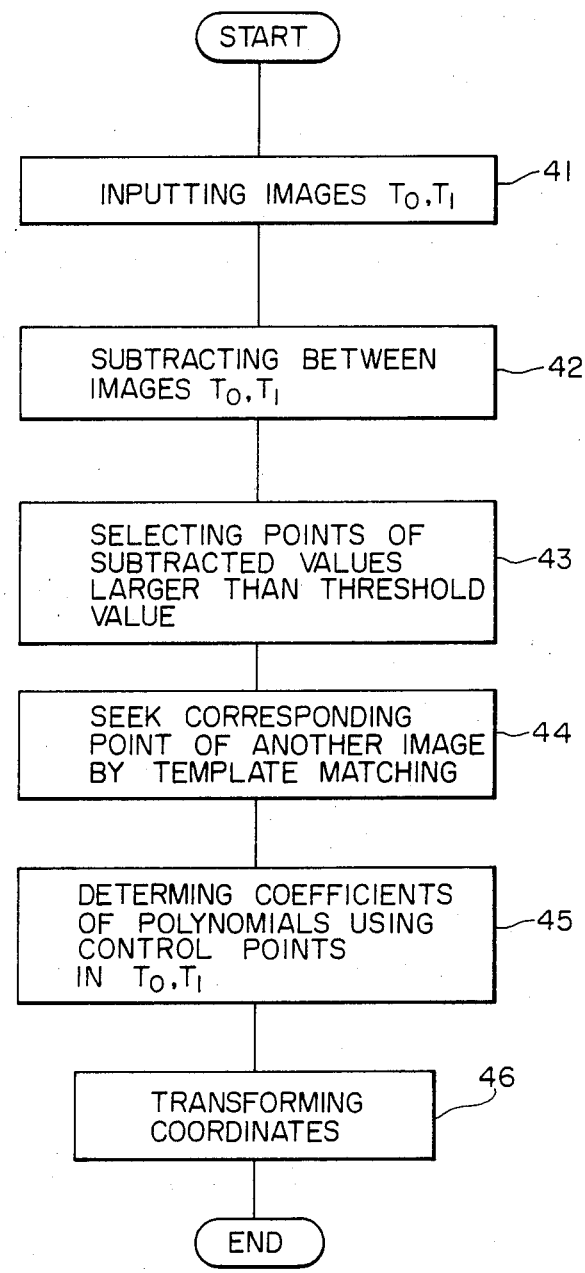
FIG. 11 is a flow chart of the processes of FIGS. 9 and 10.

FIG. 11 shows the aforementioned processing procedures. The threshold setting of the present processing procedures, as indicated at step 43 may be conducted by either averaging all the picture elements, for example, or selecting such a predetermined number of, for example, ten to twenty points in one image as are larger than the threshold value. Incidentally, it goes without saying that the processes shown in FIG. 11, including the aforementioned extraction of the standard points may be conducted at the aforementioned block unit.

Figure 12A:
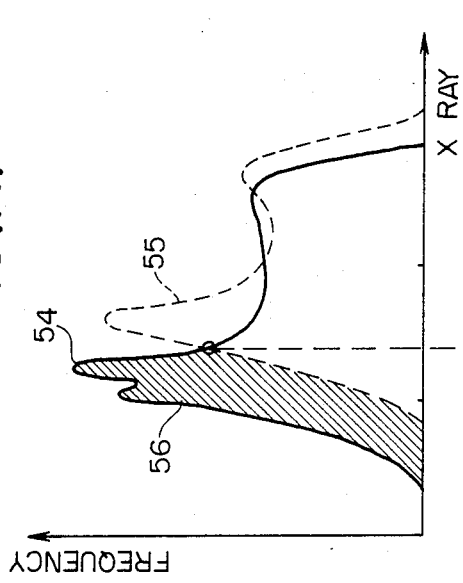
FIGS. 12(A), 12(B) and 13(A), 13(B) are diagrams schematically showing the process of extracting a standard point.
Figure 12B:
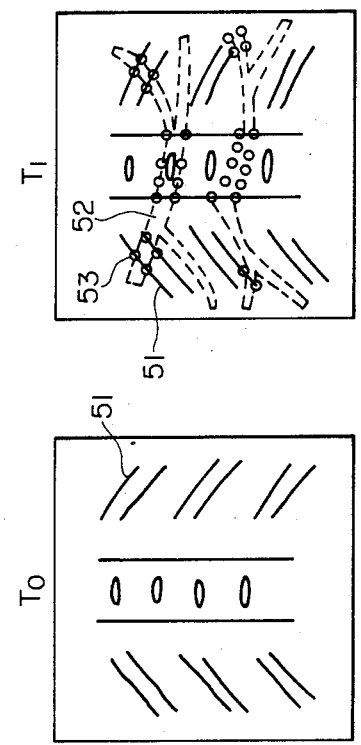

FIG. 12 shows the preprocessing of a second embodiment of the standard point extracting method according to the present invention and the processing of the histograms of the mask image $T_0$ and the live image $T_1$. FIG. 12(A) shows the images $T_0$ and $T_1$, and FIG. 12(B) shows the X ray strength histograms of the same images. Reference numeral 51 indicates the bones, the numeral 52 indicates the vascular tracts into which the contrast media has been injected. Numeral 53 indicates the portions in which the bones and the vascular tracts are superimposed. Numerals 54 and 55 indicate the X ray strength histograms of the images $T_0$ and $T_1$, respectively.

Figure 13A:
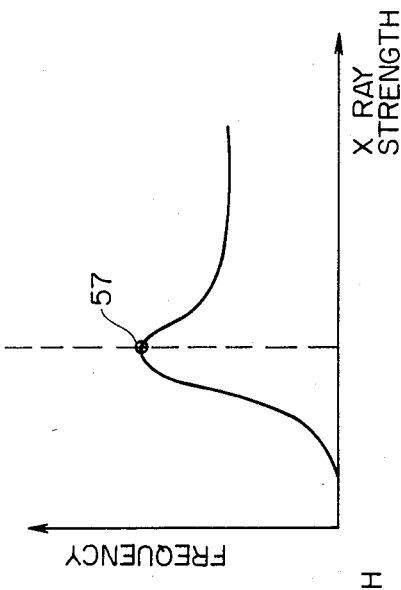

FIG. 13(A) plots the aforementioned histograms 54 and 55 against one coordinate. The hatched portion of FIG. 13(A) is a portion of the low X ray strength region, in which the frequency of the live image is higher than that of the mask image. That portion is apparently the portion which is influenced by the contrast media. More specifically, the aforementioned hatched portion 56 is thought to be that (which is indicated at 53 in FIG. 12), in which the vascular tracts having the contrast media injected thereinto and the bones are superimposed. The process of automatically detecting that portion will be described in the following.

Figure 13B:
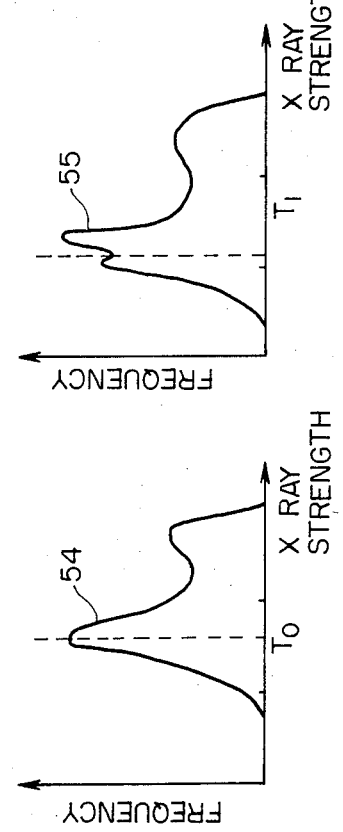
Figure 14:
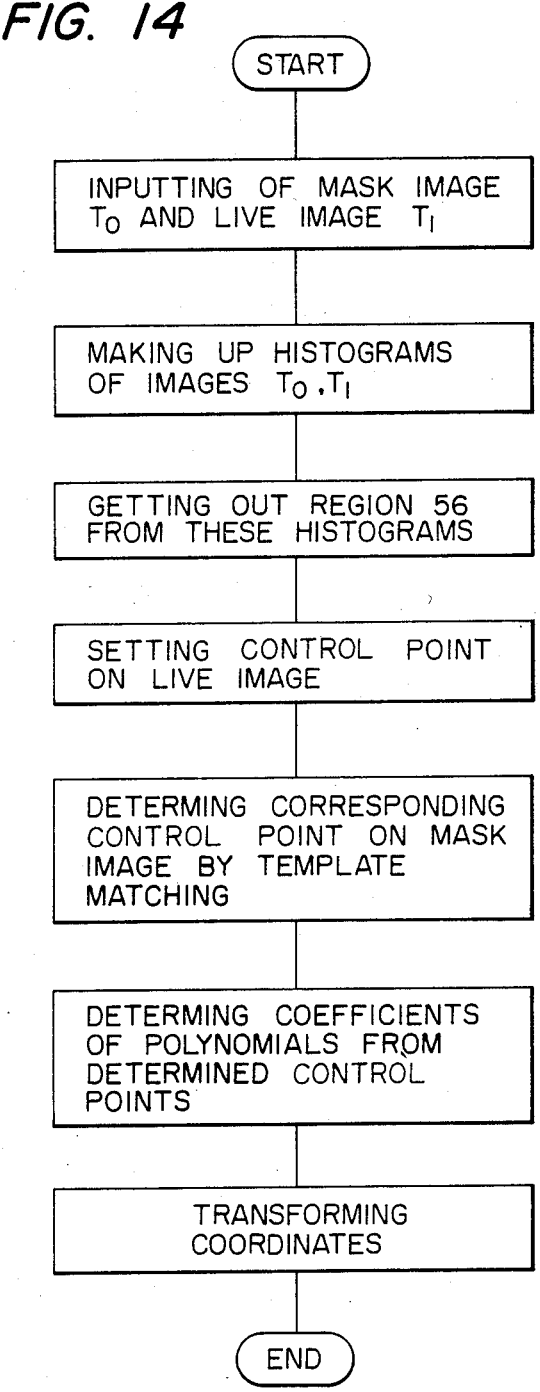
FIG. 14 is a flow chart of the processes of FIGS. 12(A), 12(B) and 13(A), 13(B)

FIG. 13(B) shows the integrated value of the difference (i.e., the hatched portion 56) between the aforementioned histograms 54 and 55. The peak 57 of this curve provides a division, and the points having a lower X ray strength than that of the division are extracted from the live image $T_1$ and are used as the standard points. The subsequent processes are similar to those of the foregoing embodiments. FIG. 14 shows the processes of the present embodiment. The processes shown in FIG. 14 may naturally be conducted in the aforementioned unit, including the aforementioned standard point extractions.

Figure 15:
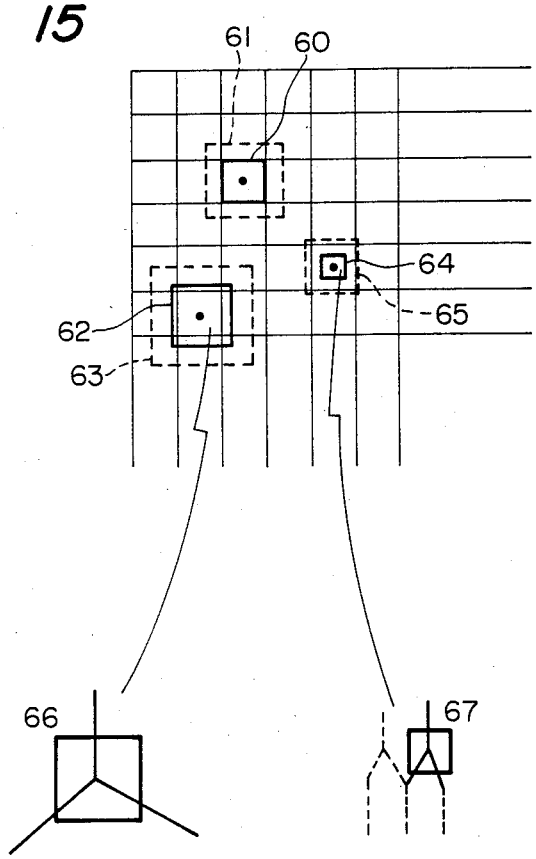
FIG. 15 is a simplified diagram schematically showing the variable template method of the present invention.
Figure 16:
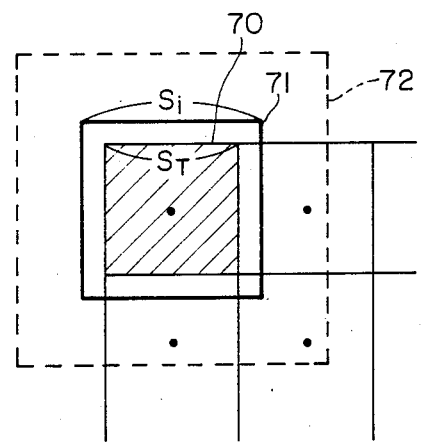
FIG. 16 is a diagram showing a specific method of setting the variable template.

A method of determining the size of the template according to the third feature of the present invention will be described in detail in the following. The present method is characterized, as shown in FIG. 15, in that a template 62 having a larger size is applied to a portion 66 having coarse construction whereas a template 64 having a smaller size is applied to a portion 67 having fine construction. As shown in FIG. 16, more specifically, if the gap between the standard points is designated as L, it is assumed that a mesh region 70 having a size of L×L about the standard point, a template region 71 having a size of M×M and a searched region 72 having a size of N×N be set. Next, the method of setting the size of the template 71 according to the partial structure will be described in the following. To determine the construction of the mesh region 70, the following standard deviation $\sigma_L$ is used:

$$\sigma_L = \sqrt{\frac{1}{L^2} \sum_{i=1}^{L} \sum_{j=1}^{L} [f(x_i, y_j) - \bar{f}]^2} , \quad (1)$$

(wherein: $\bar{f} = \sum_{i=1}^{L} \sum_{j=1}^{L} f(x_i, y_j)/L^2$.

Here, if the standard deviation of the whole image is designated as $\bar{\sigma}$, the standard template size as $S_T$, and the threshold value of the standard deviation as $V_T$, then the template size $S_i$ of each portion is set by the following equation:

$$S_i = \alpha \cdot S_T \cdot \frac{\bar{\sigma}}{\text{MAX}(\sigma_L, V_T)} . \quad (2)$$

The threshold value $V_T$ in the equation (2) is used to prevent the standard deviation $\sigma_L$ from becoming excessively small and the template size $S_i$ from becoming excessively large. Incidentally, it is quite natural that a method of setting a predetermined template size in advance for each image portion can be used in addition to the aforementioned method.

A method of smoothing the positional discrepancy vectors according to the fourth feature of the present invention will be explained in the following. The smoothing method is composed of the removal and estimation of the positional discrepancy vectors. First of all, the removal is divided into two steps, of which the first step effects the removal by the histogram of the correlation indicating the matching similarity, as shown in FIG. 17(a). In this Figure, letters $c_p$ indicate peaks, and letters $c_i$ indicate threshold values. Threshold values $c_i$ can be set by the following equation using a histogram dispersion $\sigma_c$:

$$c_i = c_p - \alpha \cdot \sigma_c$$

(wherein $\alpha$ designates a constant).
At the second step, moreover, as shown in FIG. 17(b), the vector of the standard point noted is removed by comparing it with neighboring vectors. Now, if the value (in the direction x or y) of the center vector noted is designated as $d_0$, the value of a neighboring point as $d_i$ (i=1 to 8), and the number of values $d_i$ satisfying the threshold value of the aforementioned correlation at n, the condition for the removal is expressed by the following relationships:

$$n \geq n_0;$$

and $$|d_0 - \bar{d}_i| \geq \Delta d$$

(wherein: $n_0$ designates the threshold value of the number n; $\bar{d}_i$ designates the mean value of the values of the neighboring points, i.e., $$\bar{d}_i = \sum_{i=1}^{n} d_i/n;$$

and $\Delta d$ designates the threshold value of the positional discrepancies. What is meant by the present condition is based upon the fact that the positional discrepancies caused by bodily motions are assumed to have a strong correlation when their neighborhood is examined. As indicated at 83 in FIG. 17(b), therefore, the vectors having singular motions are removed to realize the extractions of large-scale smooth changes.

Next, an embodiment of the process for estimating the true positional discrepancy vectors removed and located at the standard points will be described with reference to FIG. 18. Reference numeral 96 appearing in FIG. 18 indicates a standard point to be assumed. Moreover, meshes 91 and 92 indicate the neighboring standard point regions of 3×3 and 5×5 around the standard point 96. Now, in the mesh 91, the standard point distribution states are assumed to be indicated at 93 to 95 by the aforementioned selections. In FIG. 18, symbol X indicates that the standard point is selected, symbol indicates that the standard point is removed. If, at this time, the state is as indicated in FIG. 93, the positional discrepancy vectors of the standard point 96 can be estimated from the values of the points above and below the standard point. In the state of FIG. 94, the positional discrepancy vectors of the standard point 96 can be estimated from the values of the points at the righthand and lefthand sides of the standard point. In the state of FIG. 95, the positional discrepancy vectors of the standard point 96 can be estimated from the values of the lefthand upper and righthand lower corners.

In addition to the aforementioned methods, incidentally, there can be adopted a method where the weighted mean of the values of all the standard points of the region 91 having a size of 3×3 around the standard point 96 is used.

Figure 19:
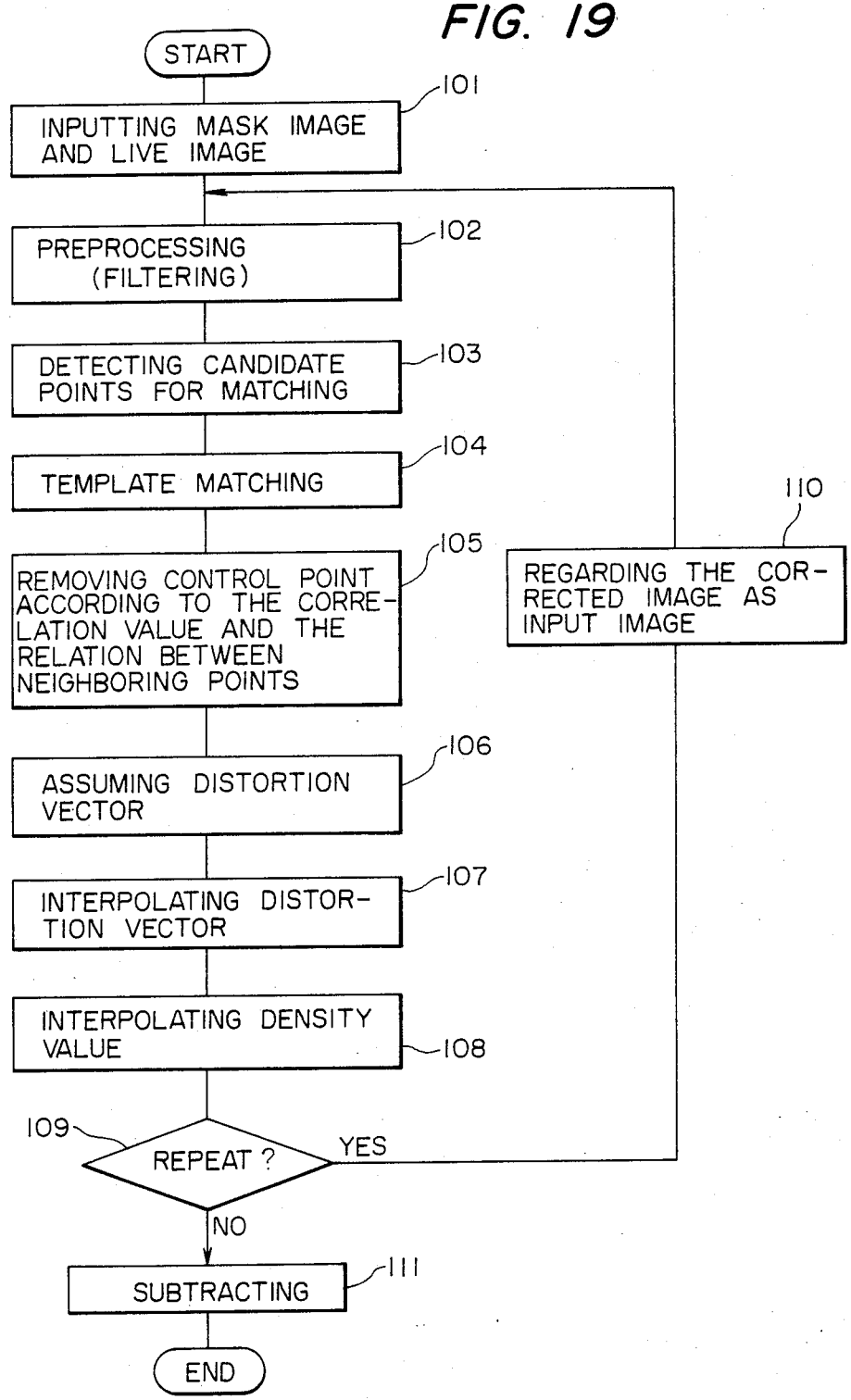
FIG. 19 is a block diagram schematically showing a repeated process.

FIG. 19 explains the iterative processing according to the fifth feature of the present invention. The present processes are used to enhance the accuracy in the registration by repeating steps 102 to 110 of FIG. 19 and to effect flexible processings, which are advanced by manual commands and repeated until they are stopped when necessary accuracy is achieved, by adding the loop control instructions of step 109. Incidentally, the repeating condition can naturally be evaluated with a mean value $\bar{D}$ of all the distortion vectors by, for example, automatically judging the relationship of $\bar{D} \leq D_0$ (wherein $D_0$ designates the threshold value).

Although the present invention has been described in detail in connection with the embodiments thereof, it can also be applied to pattern recognition, automatic image composition, image editing and so on. Moreover, the shape of the template should not be limited to being A square but can be various other shapes such as circles, rectangles or triangles, if necessary.

As has been described heretofore, according to the present invention, the image registration is conducted at the block unit by dividing the image into blocks. Processing can be conducted in parallel for each block thereby remarkably shortening the processing time. Moreover, the method of setting the standard points can be realized simply, thus improving processing efficiency.

According to the present invention, furthermore, accurate registration can be realized by changing the template size in accordance with the differences in construction of the partial images and by smoothing the positional discrepancy vectors obtained by the matching.

By combining the above with iterative processing, it is possible to improve accuracy, and allow effective interactive processing.

In the above description, standard point means control point or correspoing point in the satellite image processing.

What is claimed is:

1. For use in a digital subtraction method of extracting vascular tracks by conducting subtractions between a first X-ray image before injection of a contrast medium and second X-ray image subsequent to the injection of the contrast medium, an image registration method comprising the steps of:
   (a) dividing said first and second X-ray images into a plurality of blocks;
   (b) from each of said blocks extracting a standard point for registration;
   (c) adjusting positional discrepancies between corresponding blocks of said first and second X-ray images by transforming the coordinates thereof on the basis of the extracted standard point; and
   (d) modifying the transformed coordinates in prescribed portions of said blocks along respective interfaces thereof with adjacent blocks so as to effect a smoothing of image features connected through said interfaces;
   wherein said standard point extracting step (b) includes the sub-steps of: determining the difference between said first and second X-ray images; for each of plural picture elements of which said images are comprised comparing the determined difference in each picture element with a predetermined threshold value; and selecting as said standard point the point which remains as a result of the threshold comparison.

2. For use in a digital subtraction method of extracting vascular tracks by conducting subtractions between a first X-ray image before injection of a contrast medium and second X-ray image subsequent to the injection of the contrast medium, an image registration method comprising the steps of:
   (a) dividing said first and second X-ray images into a plurality of blocks;
   (b) from each of said blocks extracting a standard point for registration;
   (c) adjusting positional discrepancies between corresponding blocks of said first and second X-ray images by transforming the coordinates thereof on the basis of the extracted standard point; and
   (d) modifying the transformed coordinates in prescribed portions of said blocks along respective interfaces thereof with adjacent blocks so as to effect a smoothing of image features connected through said interfaces;
   wherein said standard point extracting step (b) includes the sub-steps of: making up first and second histograms respectively corresponding to said first and second X-ray images; determining a curve indicative of the integrated values of the differences between said first and second histograms; and conducting a selection from said second X-ray image by using as said standard point the point which has a lower X-ray strength than that at the peak point of the determined curve.

3. For use in a digital subtraction method of extracting vascular tracks by conducting subtractions between a first X-ray image before injection of a contrast medium and second X-ray image subsequent to the injection of the contrast medium, an image registration method comprising the steps of:
   (a) dividing said first and second X-ray images into a plurality of blocks;
   (b) from each of said blocks extracting a standard point for registration;
   (c) adjusting positional discrepancies between corresponding blocks of said first and second X-ray images by transforming the coordinates thereof on the basis of the extracted standard point; and
   (d) modifying the transformed coordinates in prescribed portions of said blocks along respective interfaces thereof with adjacent blocks so as to effect a smoothing of image features connected through said interfaces;
   wherein said standard point extracting step (b) includes the sub-steps of: comparing the positional discrepancy of said standard point, which has been extracted for each divided block, and the positional discrepancy of another standard point, which has been extracted for another block in the neighborhood of said divided block; and removing the standard point which is judged to be singular as a result of said comparison.

4. For use in a digital subtraction method of extracting vascular tracks by conducting subtractions between a first X-ray image before injection of a contrast medium and second X-ray image subsequent to the injection of the contrast medium, an image registration method comprising the steps of:
   (a) dividing said first and second X-ray images into a plurality of blocks;
   (b) from each of said blocks extracting a standard point for registration;
   (c) adjusting positional discrepancies between corresponding blocks of said first and second X-ray images by transforming the coordinates thereof on the basis of the extracted standard point; and
   (d) modifying the transformed coordinates in prescribed portions of said blocks along respective interfaces thereof with adjacent blocks so as to effect a smoothing of image features connected through said interfaces;
   wherein said standard point extracting step (b) includes the sub-steps of: correlating said first and second X-ray images for each partial region that is determined by a template having an area varying with the coarseness of the image; and selecting said standard point on the basis of the correlated result.

* * * * *